(12) United States Patent
Kruiskamp et al.

(10) Patent No.: US 9,064,062 B2
(45) Date of Patent: Jun. 23, 2015

(54) CIRCUITS AND METHODS TO REDUCE PIN COUNT OF A SINGLE CHANNEL DEVICE WITH A MULTI-CHANNEL SERIAL INTERFACE

(75) Inventors: Marinus Wilhelmus Kruiskamp, 's-Hertogenbosch (NL); Jakobus Johannes Verhallen, Oss (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 707 days.

(21) Appl. No.: 13/354,603

(22) Filed: Jan. 20, 2012

(65) Prior Publication Data

US 2013/0182850 A1 Jul. 18, 2013

(30) Foreign Application Priority Data

Jan. 13, 2012 (EP) .................................... 12368001

(51) Int. Cl.
  *H04R 5/00* (2006.01)
  *G06F 13/42* (2006.01)
  *H04H 20/47* (2008.01)
  *H04H 20/88* (2008.01)

(52) U.S. Cl.
  CPC ........... *G06F 13/4291* (2013.01); *H04H 20/47* (2013.01); *H04H 20/88* (2013.01)

(58) Field of Classification Search
  USPC ................................................ 370/535, 536
  See application file for complete search history.

(56) References Cited

U.S. PATENT DOCUMENTS

| | | | |
|---|---|---|---|
| 4,815,131 A | 3/1989 | Okamoto | |
| 5,347,499 A | 9/1994 | Woo | |
| 5,832,255 A * | 11/1998 | Roberts et al. | ................. 713/500 |
| 5,864,309 A * | 1/1999 | Hung | ................................ 341/61 |
| 5,923,710 A | 7/1999 | Shuholm et al. | |
| 6,999,827 B1 | 2/2006 | Yong | |
| 7,113,907 B2 | 9/2006 | Duewer | |

(Continued)

FOREIGN PATENT DOCUMENTS

EP   12368001.9-2212   5/2012

OTHER PUBLICATIONS

"Design of Audio Demultiplexing Intellectual Property Module Based on SDI," by Yu-Hong Zhao et al., 2009 IEEE, 978-1-4244-4669-8/09, pp. 349-352.

(Continued)

*Primary Examiner* — Melvin Marcelo
*Assistant Examiner* — Peter Solinsky
(74) *Attorney, Agent, or Firm* — Saile Ackerman LLC; Stephen B. Ackerman; Billy Knowles

(57) ABSTRACT

A channel selection circuit in a serial audio communication device provides channel selection for insertion or extraction of data to or from a multiplexed serial data stream without the requirement of extra channel selection inputs. The channel selection circuit has multiple counters structured such that each counter represents a channel of the serial data stream. The input of each counter receives one of the multiple synchronizing timing signals. The input of the designated counter receives one timing signal that has the greatest frequency. The remaining counters receive the word select timing signals for determining which channel is being selected. A ready output of each counter is a channel indicator in communication with multiple signal selection circuits for selecting the multiple timing signals to be transferred to a data processing device for inserting or extracting data to or from the multiplexed serial data stream.

16 Claims, 12 Drawing Sheets

(56) References Cited

U.S. PATENT DOCUMENTS

| | | | |
|---|---|---|---|
| 7,711,974 | B1 | 5/2010 | You et al. |
| 7,715,513 | B2 | 5/2010 | Lin et al. |
| 7,797,536 | B1* | 9/2010 | Lyle ............................. 713/168 |
| 8,416,617 | B2* | 4/2013 | Choi et al. ................... 365/163 |
| 2005/0129071 | A1* | 6/2005 | Boerstler et al. ............. 370/535 |
| 2008/0005411 | A1* | 1/2008 | Kim ............................... 710/62 |
| 2009/0271592 | A1* | 10/2009 | Jensen .......................... 712/214 |

OTHER PUBLICATIONS

TFA9882 Product data sheet, "3.4 W I2S input mono class-D audio amplifier," Rev. 2—Apr. 20, 2011, NXP, 31 pgs.

Phillips Semiconductors "I2S bus specification," Feb. 1986, Revosed: Jun. 5, 1996, pp. 1-7.

Analog Devices Inc., "Omnidirectional Microphone with Bottom Port and I2S Digital Output," Data Sheet, ADMP441, 2011, pp. 1-16.

* cited by examiner

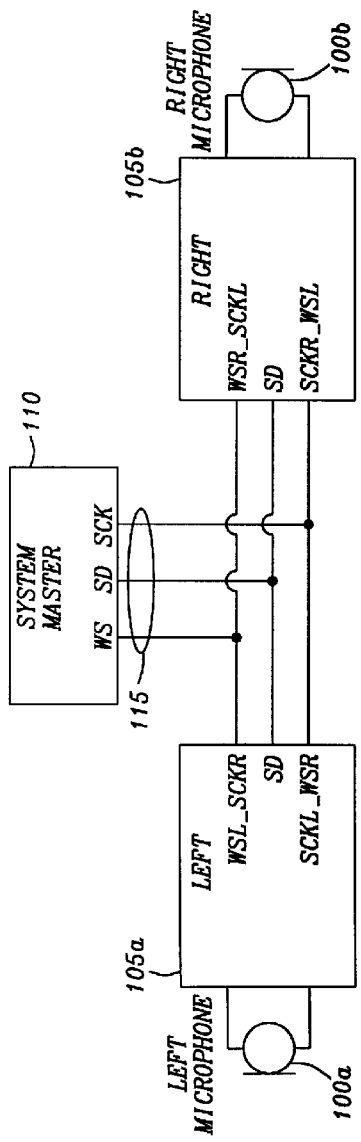
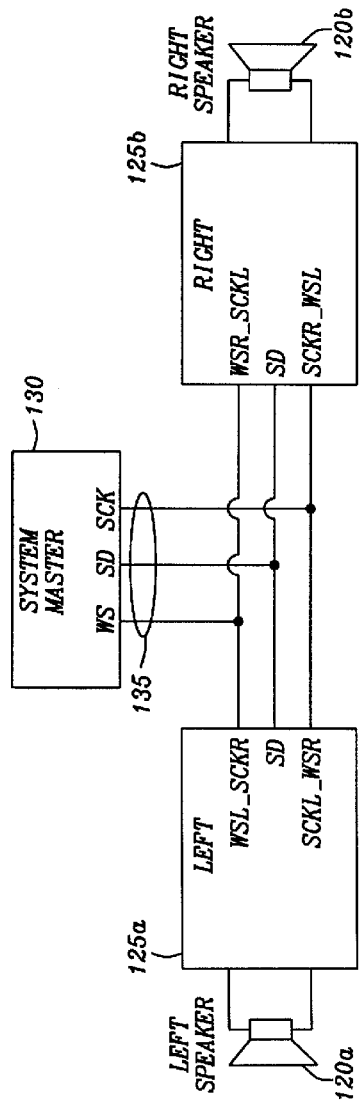

```
//---------------------------------------------------------
// (c) Copyright 2011, Dialog Semiconductor BV
// All Rights Reserved
//---------------------------------------------------------
module classd100_dig_clkdet_n100
// parameters
#( Parameter CNT_WID = 3)    // width of the counter in bits
// ports
 (input   wire  clk_in,
  input   wire  reset,
  input   wire  i_am_other,
  output  reg   i_am_ready);

// derive the end and check conditions from the counter width
localparam CNT_END = 2**CNT_WID-1;   //    End condition
localparam CNT_CHK = CNT_END-1;      //  check condition // declare the counter
reg [CNT_WID-1:0] clk_cnt;

// count clock pulses
// at counter==END-1, check if I am fastest, set and hold if so
always @(posedge reset or posedge clk_in) begin
    if (reset == 1'b1) begin
        clk_cnt       <= {CNT_WID{1'b0}};
        i_am_ready    <= 1'b0;
    end else begin
// the signal i_am_ready is set (and hold) when
// A: the current counter reached end value -1 AND
// B: the opposite counter had not reached that condition yet // hold              (set condition           );

i_am_ready   <= i_am_ready | (clk_cnt == CNT_CHK &&
~i_am_other);   // look at the other counter when @6
       if (clk_cnt  != CNT_END) begin // hold counter at end
         clk_cnt    <= clk_cnt + 'h1;
       end
    end // if reset else
end // always
endmodule
```

FIG. 9a

CIRCUITS AND METHODS TO REDUCE PIN COUNT OF A SINGLE CHANNEL DEVICE WITH A MULTI-CHANNEL SERIAL INTERFACE

BACKGROUND OF THE INVENTION

1. Field of the Invention

This invention relates generally to circuits and methods for communication of digital data. More particularly this invention relates to circuits and methods for demultiplexing two channels of digital audio signals from a multiplexed serial digital data stream transferred on a serial data interface.

2. Description of Related Art

Reducing the number of pins required by an integrated circuit is an important aspect for reducing the size and cost of the integrated circuit. This is also true for monaural audio integrated circuit devices with a serial pulse code modulated (PCM) audio interface. These serial audio interfaces often have multiple channels multiplexed to a serial data stream. In a stereo audio environment, two audio signals ("left" and "right") are digitized and then time-multiplexed for transmission over the same interface. The audio integrated circuit device has at least one additional pin that is used to select the audio integrated circuit device as either a "left" channel device or a "right" channel device. The number of input/output pins on integrated circuits that have a relatively low number of pins, impacts the size of the integrated circuit and the package into which the integrated circuit is mounted. Having fewer pins can improve the size and cost of the audio integrated circuit.

An example of a serial audio interface is the $I^2S$ developed in 1986 and revised in 1996 by Philips Semiconductor N.V. (NXP Semiconductor N.V., Eindhoven, the Netherlands) and is well known in the art. The $I^2S$ bus is designed for the transfer of only audio data, while the other signals, such as sub-coding and control, are transferred separately. To minimize the number of pins required and to keep wiring simple, a 3-line serial bus is used. Referring to FIG. 1, the $I^2S$ bus consists of a serial data SD line that has two time-multiplexed data channels (LEFT CHANNEL and RIGHT CHANNEL), a word select WS line for designating the channel boundaries, and a clock line SCK for synchronizing the transmission and reception of the data. The two time-multiplexed data channels (LEFT CHANNEL and RIGHT CHANNEL) are transmitted sequentially.

Since the transmitter and receiver have the same clock signal SCK for data transmission, the transmitter, as the master, has to generate the bit clock SCK, word-select signal WS and the serial data SD. In complex systems however, there may be several transmitters and receivers, which makes it difficult to define the master. In such systems, there is usually a system master controlling digital audio data-flow between the various ICs. Transmitters then, have to generate the serial data SD under the control of an external clock SCK and an external word-select signal WS. The transmitters then act as a slave.

The serial data is transmitted in two's complement pulse coded modulation (PCM) with the most significant bit (MSB) first. The MSB is transmitted first because the transmitter and receiver may have different word lengths. It isn't necessary for the transmitter to know how many bits the receiver can handle, nor does the receiver need to know how many bits are being transmitted. When the system word length is greater than the transmitter word length, the word is truncated (least significant data bits are set to '0') for data transmission. If the receiver is sent more bits than its word length, the bits after the LSB are ignored. On the other hand, if the receiver is sent fewer bits than its word length, the missing bits are set to zero internally. And so, the MSB has a fixed position, whereas the position of the LSB depends on the word length. The transmitter always sends the MSB of the next word one clock period after the word select signal WS changes. Serial data SD sent by the transmitter may be synchronized with either the trailing (HIGH-to-LOW) or the leading (LOW-to-HIGH) edge of the clock signal SCK. However, the serial data must be latched into the receiver on the leading edge of the serial clock signal.

The word select line WS indicates the channel being transmitted, where the word select line WS=0 the LEFT CHANNEL is selected and where the word select line=1 the RIGHT CHANNEL is selected. The word select line WS may change either on a trailing or leading edge of the serial block (a string of bits from the most significant bit (MSB) to the least significant bit (LSB), but it does not need to be symmetrical. In the slave, this signal is latched on the leading edge of the clock signal. The word select line WS changes one clock period before the MSB is transmitted. This allows the slave transmitter to derive synchronous timing of the serial data that will be set up for transmission. Furthermore, it enables the receiver to store the previous data word (n−1, n, n+1) and clear the input for the next word (n−1, n, n+1).

When this interface is used to communicate with a mono audio device (i.e. a microphone or speaker), that device must know which of the two data channels (LEFT CHANNEL and RIGHT CHANNEL) needs to be used. For small audio devices without a separate control interface, this channel selection usually requires an extra pin on the integrated circuit receiving or transmitting the serial data SD.

FIG. 2 is a block diagram of an example of a stereo microphone system using an $I^2S$ output device. The left microphone 10 and the right microphone 15 are the ADMP441 microphone from Analog Device, Norwood, Mass. The ADMP441 is a low power, digital output, omni-directional MEMS microphone with a bottom port. The complete ADMP441 has a MEMS sensor, signal conditioning, an analog-to-digital converter, antialiasing filters, and power management. The output interface is a 24-bit $I^2S$ interface 25. The $I^2S$ interface 25 is the bus connection between system master 20 and the left microphone 10 and the right microphone 15. The structure of the $I^2S$ interface 25 has the serial data SD, the word select WS and the clock SCK as described above in FIG. 1. In this example, the left microphone 10 and the right microphone 15 has a separate channel selection pin 30. The voltage applied to the channel selection pin 30 determines if the microphone places the digitized serial audio in the left channel time slot or the right channel time slot of the serial data SD during transmission. If the microphone is a left microphone 10 the channel selection pin 30 is connected to the ground reference voltage. Alternately, if the microphone is the right microphone 15, the channel selection pin 30 is connected to the power supply voltage source VDD.

The system master 20 may be a digital signal processor (DSP), a microcontroller, or an encoder/decoder (CODEC). The word select signal WS and the system clock SCK is generated by the system master 20 and transferred to the left microphone 10 and the right microphone 15.

FIG. 3 is a block diagram of an example of a stereo speaker system using an $I^2S$ input device. The left speaker 60 and the right speaker 65 are driven by an audio amplifier 50 and 55 such as the TFA9882, manufactured by NXP Semiconductors N.V., Eindhoven, the Netherlands. The audio amplifiers 50 and 55 are a monaural, filter-free class-D audio amplifier in a 9-bump WLCSP (Wafer Level Chip-Size Package). It receives audio and control settings via an I²S digital interface 80. A baseband processor 70 has an I²S output circuit 75 that transfers a digitized audio signal on the I²S interface 80 to the audio amplifiers 50 and 55. The serial data SD is connected to the input A1 and the serial clock SCK to the input A2 of the audio amplifiers 50 and 55. The channel select signals WS is connected to the left channel select input WSL at the pin A2 of the audio amplifier 50. The right channel select input WSR at the pin C2 is connected to the battery power supply VBAT. For the audio amplifier 55, the channel select signals WS is connected to the right channel select input WSR at the pin C2 and the left channel select input WSL at the pin A2 is connected to the battery power supply VBAT. The audio amplifiers 50 receives the serial data SD, the serial clock SCK, and the word select signal WS, de-multiplexes the audio data from the left channel and drives the left speaker 60 through a class-D amplifier within the audio amplifiers 50. Similarly, the audio amplifiers 55 receives the serial data SD, the serial clock SCK, and the word select signal WS, de-multiplexes the audio data from the right channel and drives the right speaker 65 through a class-D amplifier within the audio amplifiers 55.

The disadvantage of both examples of FIGS. 2 and 3 is that they require an extra pin on each device strictly for selecting the audio channel. Either a dedicated "UR" pin (in case of the ADMP441), or two word-select pins (in case of the TFA9882). Small size is generally a key requirement for audio devices such as the microphones 10 and 15 of FIG. 2 and the audio amplifiers 50 and 55 of FIG. 3. The extra pins in each example are a major disadvantage that increases size and cost.

SUMMARY OF THE INVENTION

An object of this invention is to provide circuits and systems that provide channel selection and insertion or extraction of data to or from a multiplexed serial data stream without the requirement of extra channel selection inputs.

To accomplish at least this object, a channel selection circuit has multiple counters structured such that each counter represents a channel of a multiplexed serialized data stream that is to be selected. The input of each counter receives one of the multiple timing signals for synchronizing the multiplexed serialized data stream. The input of the counter of the designated channel receives one timing signal that has the greatest frequency. The remaining counters receive the word select timing signals for determining which channel is being selected. A ready output of each counter is a channel indicator in communication with multiple signal selection circuits for selecting the multiple timing signals to be transferred to a data processing device for inserting or extracting data to or from the multiplexed serial data stream.

The ready outputs of the multiple counters are inputs to a first logic circuit to create a valid signal. The valid signal is a gating signal to multiple gating circuits to transfer the multiple timing signals to data processing device to insert or extract the data at the correct timings to select the correct channel. The ready output of each of the multiple counters is in communication with ready inputs of the other counters to prevent the ready outputs of the other counters from becoming valid.

In some embodiments, the channel selection circuit has two counters structured for selecting one of two channels of serial digitized audio data in the serial data stream. The input of one of the counters is a serial timing signal having a greater frequency than the other and is applied to the counter designating the channel of the serialized data. The input of the other counter receives the word select timing signal for selecting the correct channel to be selected. The ready output of one of the two counters is applied to a select input of two multiplexers. The inputs of the two multiplexers to be selected are the serial timing signal and the word select timing signal. The selection being such that the serial timing signal and the word select timing signal are applied to a data processing device.

In various embodiments, the data processing device is a sound receiving device that receives sound, converts the sound to an electrical signal, and then converts the electrical signal to a digital signal that then is serialized for transmission. In other embodiments, the data processing device is a sound reproduction device that receives a serialized data stream, converts the converts the data stream to an electrical signal, and then converts the electrical signal to sound.

The ready outputs of the two counters are applied to a logic circuit that to generates a valid signal that is applied to a second logic circuit for gating the output of the multiplexers to the data processing device. The ready outputs of the two counters are cross connected to a ready input of the opposite counter to prevent the ready output of the opposite counter from becoming valid.

In other embodiments that accomplish at least this embodiment, a serial communication system has a system master device for generating a serial synchronizing clock signal and at least one word select signal. The system master device will receive or transmit a multiplexed serialized data stream. The communication system includes at least one transmitting or receiving device in communication with the system master device to receive the serial synchronizing clock signal and the at least one word select signal. From the serial synchronizing clock signal and the at least one word select signal, the transmitting or receiving device determines an assigned channel within the multiplexed serialized data stream into which or from which the transmitting or receiving device is to transmit or receive the multiplexed serialized data stream.

The at least one transmitting or receiving device has a channel selection circuit that includes multiple counters structured such that each counter represents a channel of a multiplexed serialized data stream that to be selected. The input of each of the counters receives one of the multiple timing signals for synchronizing the multiplexed serialized data stream. The input of the designated channel receives one of the timing signals that has the greatest frequency. The remaining counters receive the word select timing signals for determining which channel is being selected. A ready output of each counter is a channel indicator in communication with multiple signal selection circuits for selecting the multiple timing signals to be transferred to a data processing device for inserting or extracting data to or from the multiplexed serial data stream.

The ready outputs of the multiple counters are inputs to a first logic circuit to create a valid signal. The valid signal is a gating signal to multiple gating circuits to transfer the multiple timing signals to data processing device to insert or extract the data at the correct timings to select the correct channel. The ready output of each of the multiple counters is in communication with ready inputs of the other counters to prevent the ready outputs of the other counters from becoming valid.

In still other embodiments that accomplish at least the object of this invention, a method for determining a channel of a multiplexed serialized data stream by a transmitting or receiving device from a serial synchronizing clock signal and the at least one word select signal begins by applying the serial synchronizing clock signal to a to a count input of a channel designating counter and the at least one word select signal to a count input at least one other counter. When the channel designating counter has reached a channel length count, the channel designating counter activates a ready signal identifying the channel of the transmitting or receiving device. The remaining other counters are prevented from activating the ready signal. The serial synchronizing clock and the at least one word select line is gated and transmitted with the ready signal for the channel to insert or extract the serialized data designated for the transmitting or receiving device.

In various embodiments, the transmitting or receiving device is a sound receiving device that receives sound, converts the sound to an electrical signal, and then converts the electrical signal to a digital signal that then serialized for transmission. In other embodiments, the transmitting or receiving is a sound reproduction device that receives a serialized data stream, converts the converts the data stream to an electrical signal, and then converts the electrical signal to sound.

The ready outputs of the channel designating counter and the other counters are logically combined to generate a valid signal for gating the synchronized clocking signal and the word select signal at the correct time for selecting the correct data from the multiplexed serialized data stream.

BRIEF DESCRIPTION OF THE DRAWINGS

FIG. 4a is a block diagram of a stereo microphone system using $I^2S$ input out devices embodying the principles of this invention.

FIG. 4b is a block diagram of a stereo speaker system using $I^2S$ input devices embodying the principles of this invention.

FIG. 9a is a Verilog hardware description language (HDL) listing describing the structure of the counters of FIG. 5 embodying the principles of this invention.

DETAILED DESCRIPTION OF THE INVENTION

Figure 1:
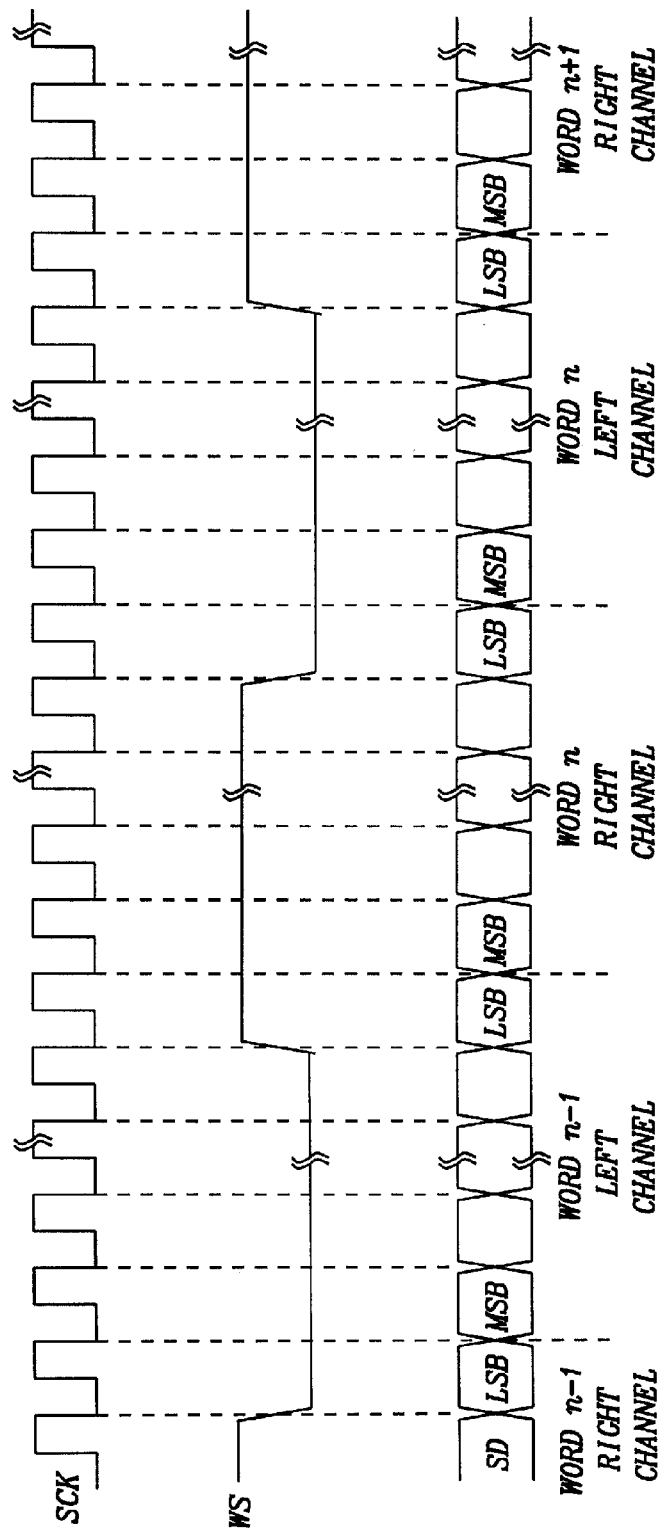
FIG. 1 is a graph of the timing and multiplexed serialized data stream signals of an $I^2S$ serial bus.
Figure 2:
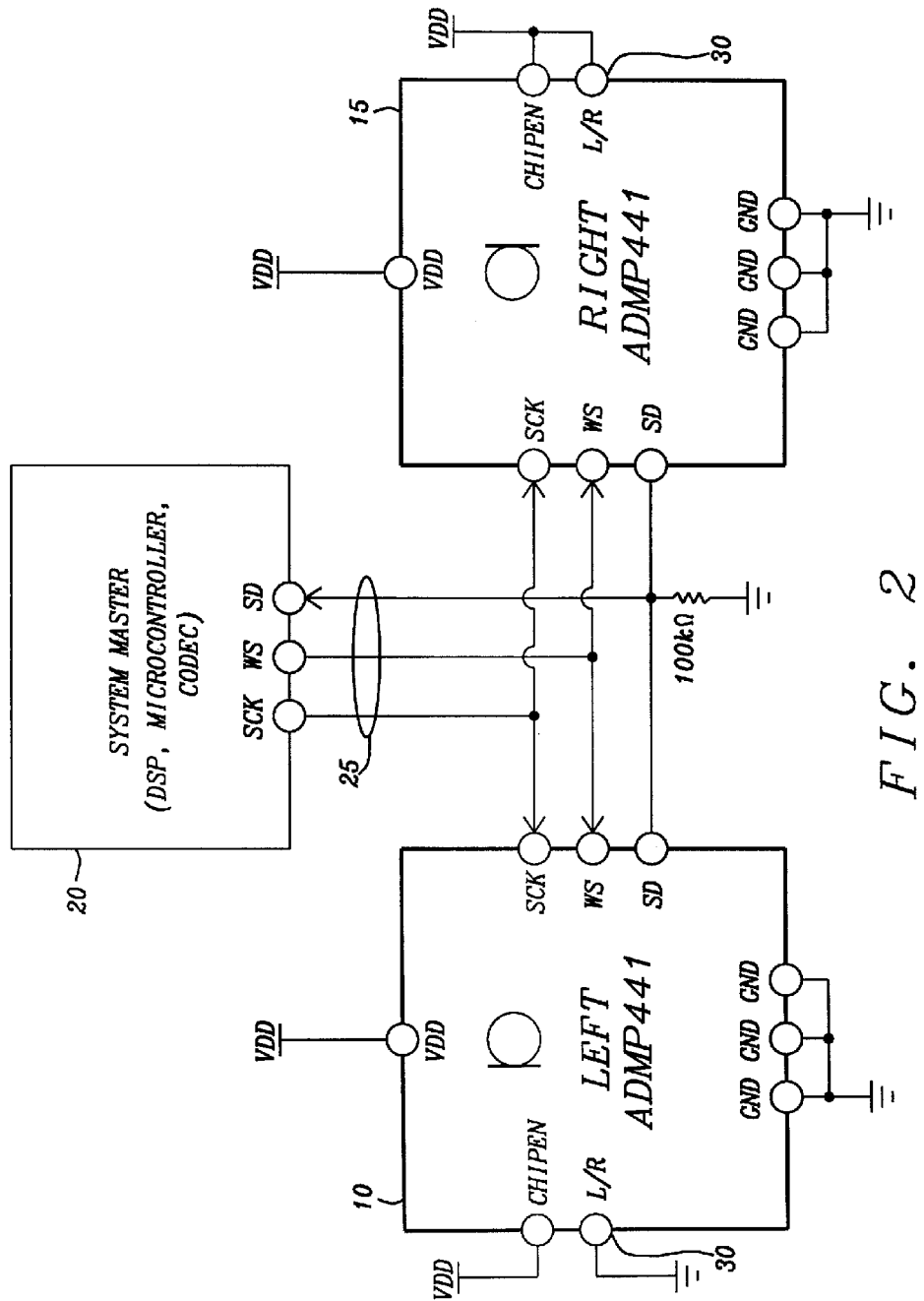
FIG. 2 is a block diagram of an example of a stereo microphone system using an $I^2S$ output device.
Figure 3:
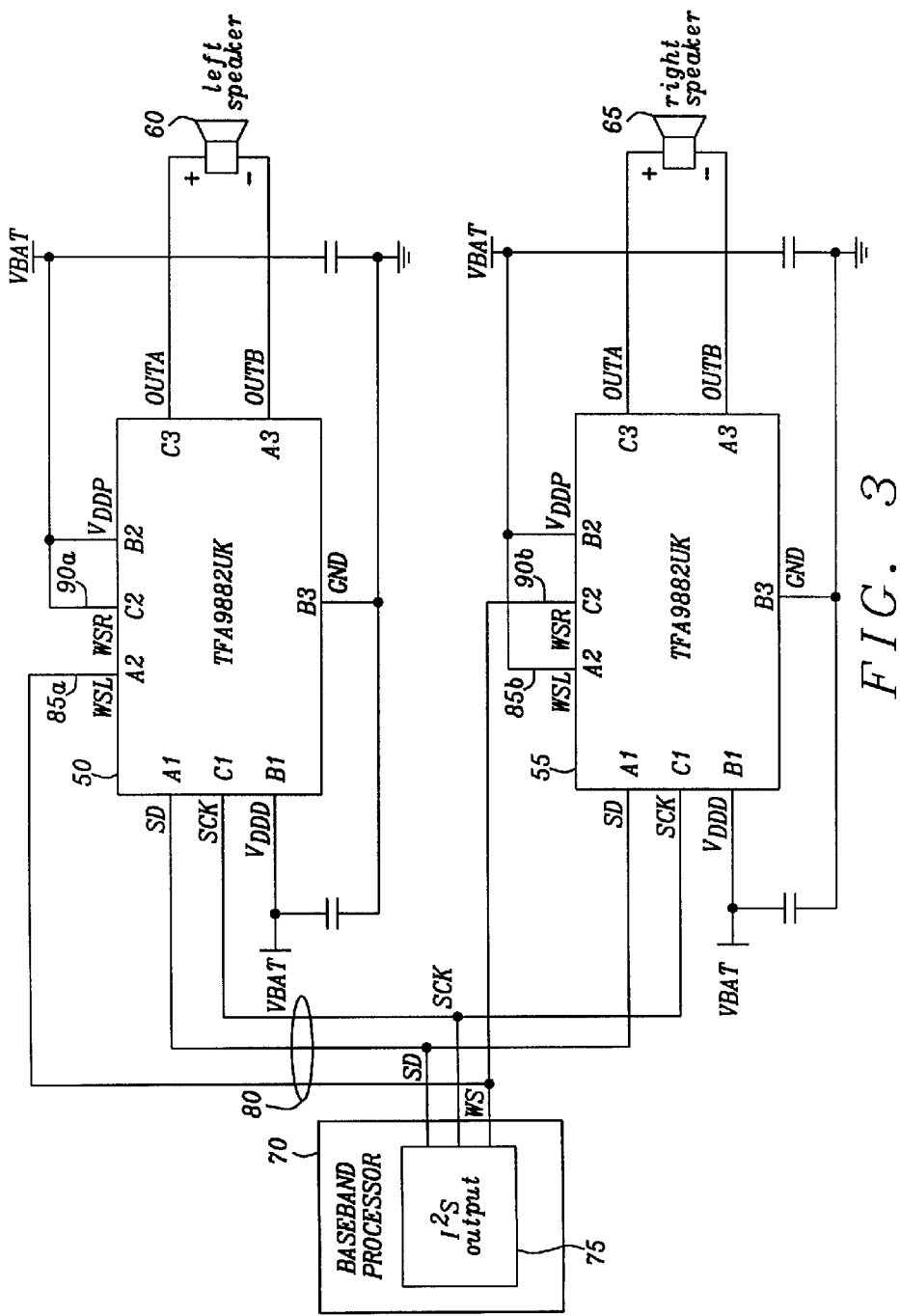
FIG. 3 is a block diagram of an example of a stereo speaker system using an $I^2S$ input device.

As described above, the transmit and receive circuits of the prior art have dedicated pins connected to the serial clock SCK and the word select WS pins of an $I^2S$ bus. The circuits and methods embodying the principles of the present invention employ two pins that receive either the word select signal WS or the serial clock signal SCK. This provides two possible connections for the word select signal WS and the serial clock signal SCK. If the transmit or receive circuits are for a left configuration, the right clock/left word select line is connected to the word select signal WS and the left clock/right word select line is connected to the serial clock signal SCK of the $I^2S$ bus. Alternately, if the transmit or receive circuits are for a right configuration, the right clock/left word select line is connected to the serial clock signal SCK and the left clock/right word select line is connected to the word select signal WS of the $I^2S$ bus. The transmit or receive circuits determine the frequency of the signals present at the right and left clock/word select lines. The serial clock signal SCK is used to latch the serial data signal SD to the receiver or the transmitter when the word select signal WS is valid for the channel being transmitted or received.

FIG. 4a is a block diagram of a stereo microphone system using $I^2S$ serial data interface transmitter circuit 105a and 105b. A left microphone 100a provides an audio analog signal to the left transmitter circuit 105a and a right microphone 100b provides a second audio analog signal to the right transmitter circuit 105b. The system master 110 system controls digital audio data-flow from the left and right transmitter circuits 105a and 105b. The system master 110 generates the word select signal WS and the serial clock signal SCK. The serial digital audio data is transmitted from left and right transmitter circuits 105a and 105b as time multiplexed serial data on the serial data lines SD of the $I^2S$ bus 110 to the system master 110.

FIG. 4b is a block diagram of a stereo speaker system using $I^2S$ serial data interface receiver circuit 125a and 125b. The system master 110 generates and transmits the serial data SD the word select signal WS, and the serial clock signal SCK on the $I^2S$ bus 135 to the left receiver circuit 125a and a right receiver circuit 125b. The system master 130 system controls digital audio data-flow to the left and right receiver circuits 125a and 125b. The serial digital audio data is received from the system master 130 by the left and right receiver circuits 125a and 125b as time multiplexed serial data from the serial data lines SD.

The left receiver circuit 125a determines the time slot of the channel in which the data for the left channel is being transmitted, extracts the serial data, de-serializes the data transfers the data to a digital-to-analog converter (D/A) to be converted to an analog audio signal. The analog audio signal is then passed to a left speaker 120a. Similarly, the right receiver circuit 125b determines the time slot of the channel in which the data for the right channel is being transmitted, extracts the serial data, de-serializes the data transfers the data to a digital-to-analog converter (D/A) to be converted to an analog audio signal. The analog audio signal is then passed to a right speaker 120b.

Figure 5:
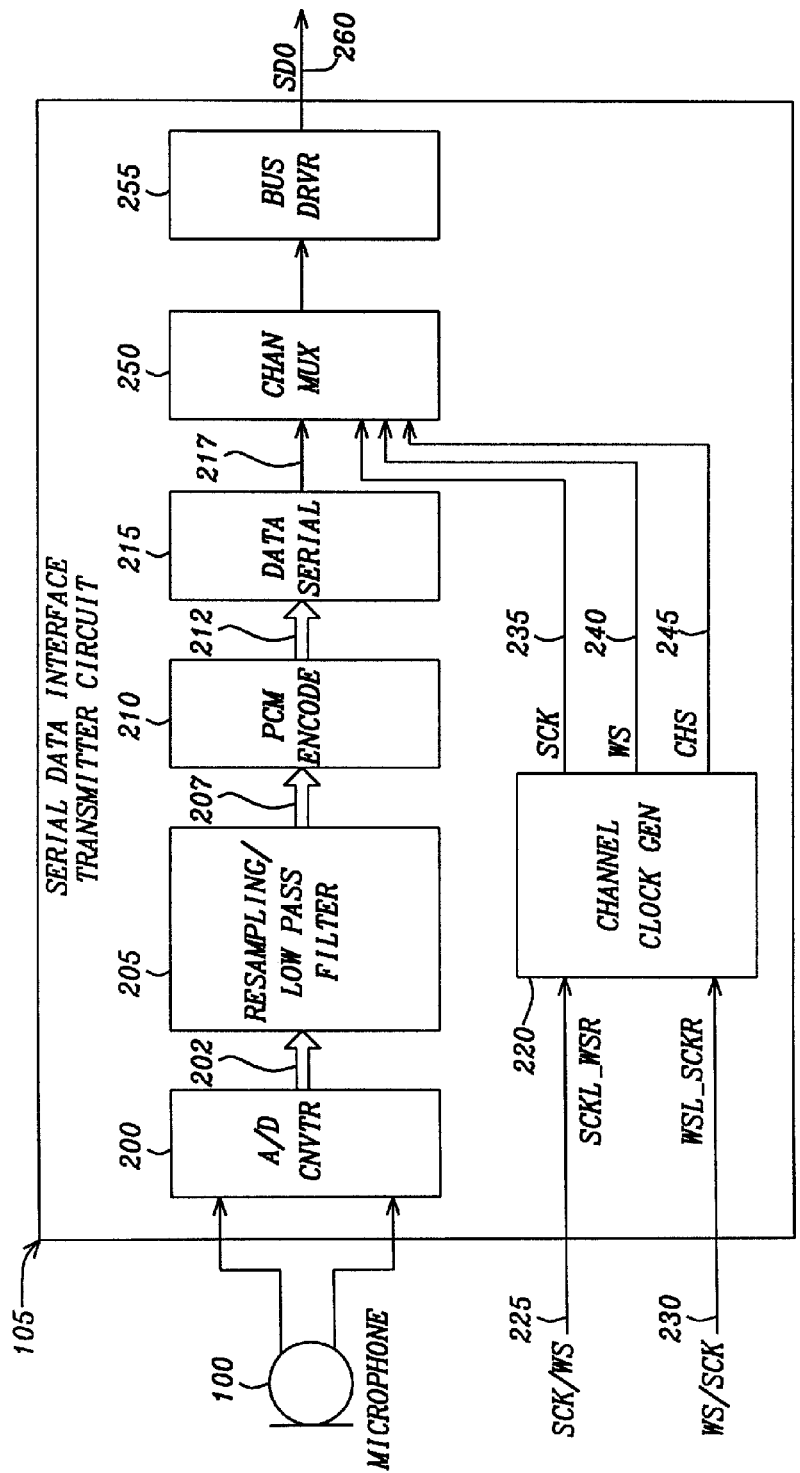
FIG. 5 is a block diagram of a serial data interface transmitter circuit embodying the principles of this invention.

FIG. 5 is a block diagram of a serial data interface transmitter circuit 105 as described in FIG. 4a. The outputs of the microphone 100 (left and right in FIG. 4b) are connected to an analog-to-digital converter 200. The parallel audio data 202 is applied to a resampling/low pass filter 205. The filtered parallel audio data 207 is the input to a pulse code modulation (PCM) 210. The PCM encoded audio data 212 is then applied to the data serializer 215. For transmitter devices that are to transmit on the left channel, the serial clock signal SCK is applied to the first clocking/word select input 225 of the channel clock generator circuit 220 and the word select signal WS is applied to the second clocking/word select input 230 of the channel clock generator circuit 220. The channel clock generator circuit 220 determines which of the first or second clocking/word select inputs 225 or 230 that the serial data clock SCK is applied. Based on the connection of the serial data clock SCK, the channel select signal 245 is placed at a valid state at the time of the correct channel (left or right). The serial data clock 235 word select signal 240 and the channel select signal 245 are transferred to the channel multiplexing circuit 250. The serial data is then transmitted to the bus driver 255 for transmission as the serial data 260 to the I²S bus 115.

Figure 6:
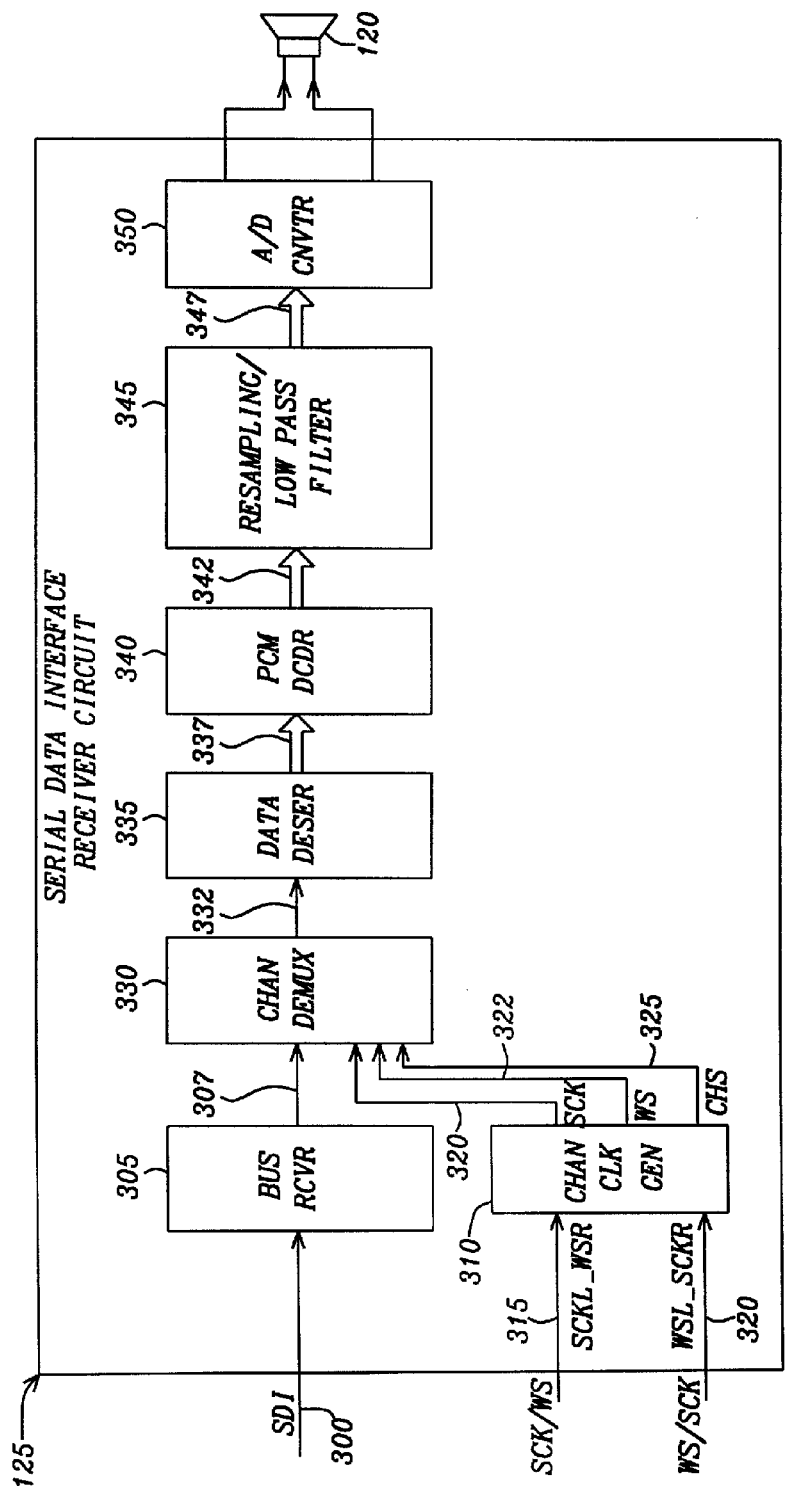
FIG. 6 is a block diagram of a serial data interface receiver circuit embodying the principles of this invention.

FIG. 6 is a block diagram of a serial data interface receiver circuit 125 as described in FIG. 4b. The serial data input 300 is received from the I²S bus 135 and applied to the input of the bus receiver 305. The bus receiver 305 amplifies and conditions the received signal to generate the serial data signal 307. For receiver devices that are to receive on the left channel, the serial clock signal SCK is applied to the first clocking/word select input 315 of the channel clock generator circuit 310 and the word select signal WS is applied to the second clocking/word select input 320 of the channel clock generator circuit 310. The channel clock generator circuit 310 determines which of the first or second clocking/word select inputs 315 or 320 that the serial data clock SCK is applied. Based on the connection of the serial data clock SCK, the channel select signal 325 is placed at a valid state at the time of the correct channel (left or right). The serial data clock 320, word select signal 322 and the channel select signal 325 are transferred to the channel demultiplexing circuit 330. At the correct time the channel select signal 325 is valid and the selected serial data 332 from the left or right channel is applied to the de-serializer circuit 335 to be transformed to a parallel data format. The parallel data 337 is applied to a resampling/low pass filter 345 to eliminate any noise. The filtered parallel data 347 is applied to an analog-to-digital converter (ND) 350. The analog signal from the ND converter 350 is applied to the speaker 120.

Figure 7A:
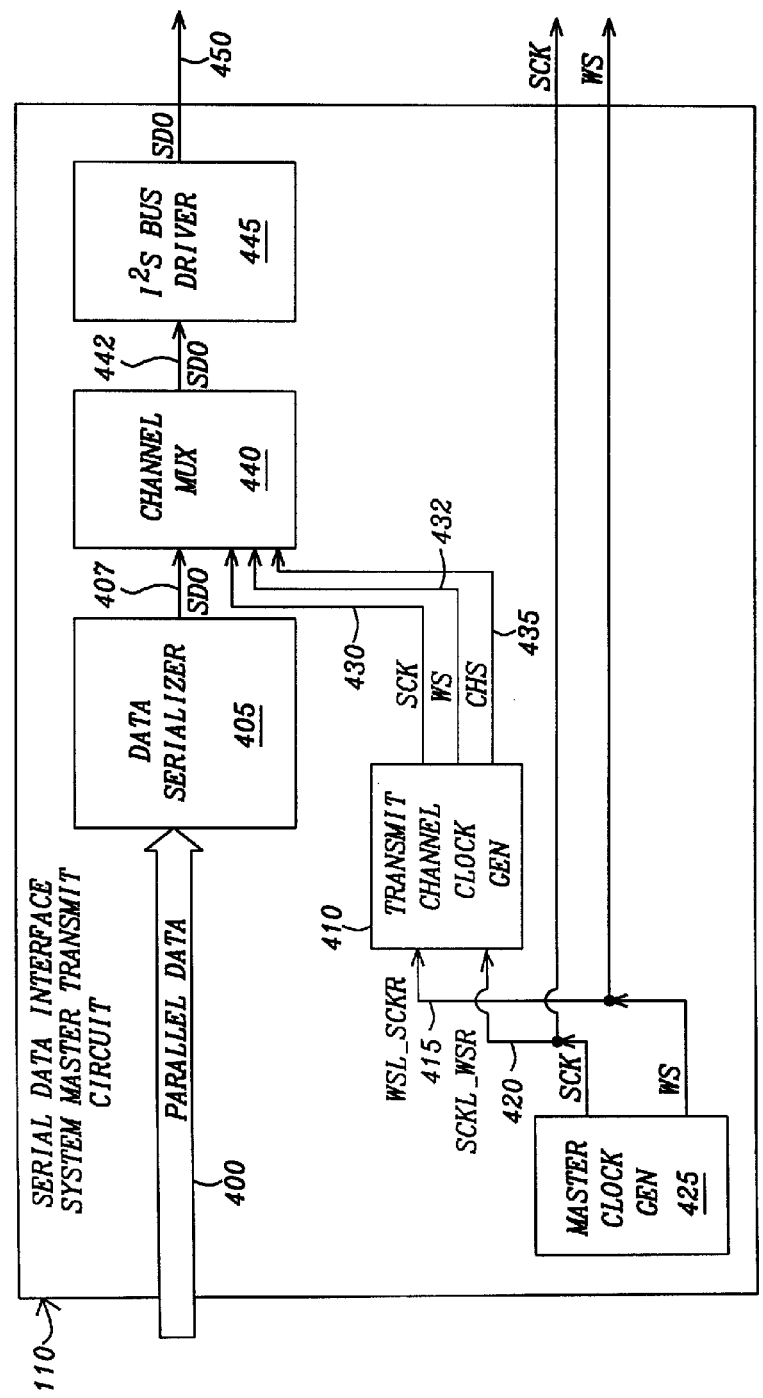
FIG. 7a is a block diagram of a system master serial data interface circuit incorporating a serial data interface transmitter circuit embodying the principles of this invention.

FIG. 7a is a block diagram of a system master serial data interface circuit 110 of FIG. 4a. The system master serial data interface circuit 110 in this example is shown as being able to transmit serial data SDO to the serial data line 450 of the I²S bus. The master clock generator 425 generates and transmits the serial clock signal SCK and the word select signal WS to the I²S bus to provide the synchronized timing for the stereo microphone system of FIG. 4a.

Parallel data 400 may be retrieved from a digital audio storage media such as a compact disk, digital video disk, or a networked storage media and processed by a digital signal processor (DSP), a microcontroller, or an encoder/decoder (CODEC) (not shown). The parallel data 400 is applied to a data serializer 405 to be converted to a serial audio data stream 442 that is applied to a channel selector 440. The serial clock signal SCK and the word select signal WS are generated and transferred from the master clock generator 425 to the first or second clocking/word select inputs 415 or 420 of the channel selector 440. The device as shown is connected for transmitting on the left channel. The serial clock signal SCK is applied to the first clocking/word select input 415 of the transmit channel clock generator circuit 410 and the word select signal WS is applied to the second clocking/word select input 420 of the channel clock generator circuit 410. The channel clock generator circuit 410 determines which of the first or second clocking/word select inputs 415 or 420 that the serial data clock SCK is applied. Based on connection of the serial data clock SCK, the channel select signal 435 is placed at a valid state at the time of the correct channel (left or right). The serial data clock 430, the word select signal 432, and the channel select signal 435 are transferred to the channel multiplexer circuit 440. The serial data 442 is then transmitted to the bus driver 445 for transmission as the serial data SDO to the I²S bus 450 at the time of the assigned channel.

Figure 7B:
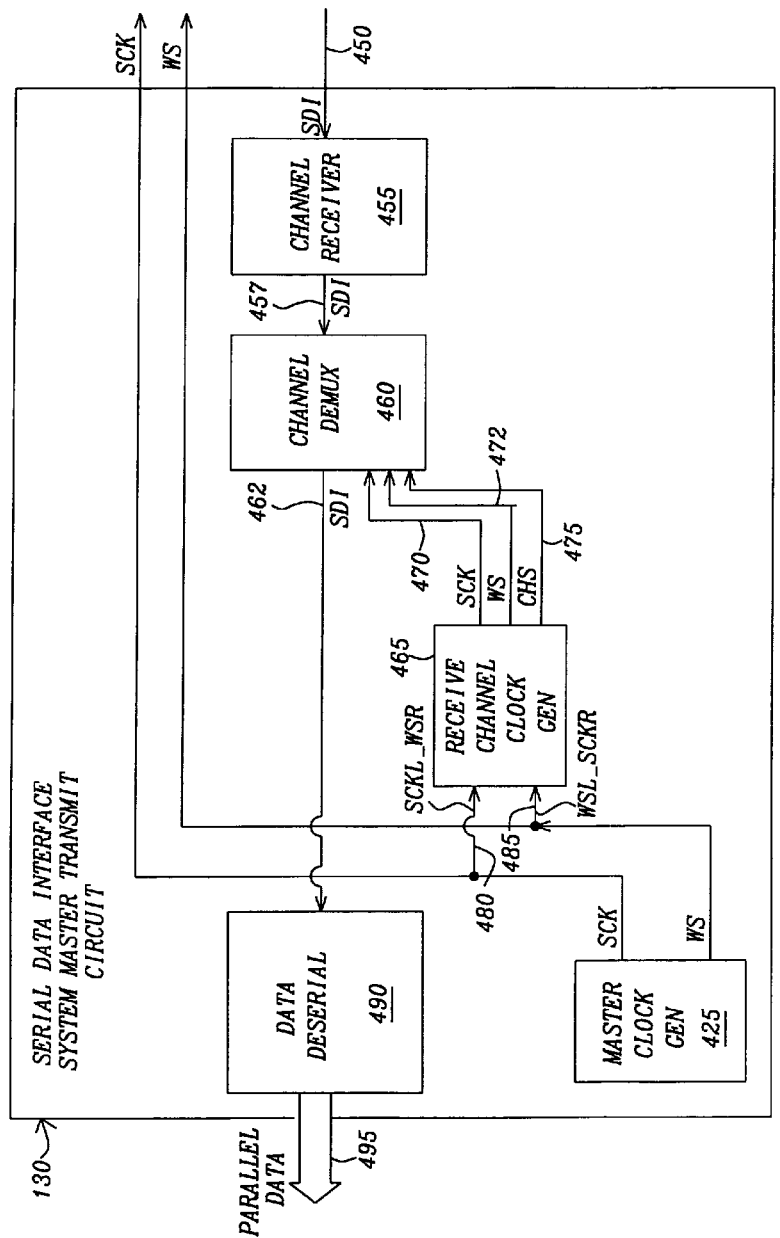
FIG. 7b is a block diagram of a system master serial data interface circuit incorporating a serial data interface receiver circuit embodying the principles of this invention.

FIG. 7b is a block diagram of a system master serial data interface circuit 130 of FIG. 4b. The system master serial data interface circuit 130 in this example is shown as being able to receive serial data SDI to the serial data line 450 of the I²S bus. The master clock generator 425 generates and transmits the serial clock signal SCK and the word select signal WS to the I²S bus to provide the synchronized timing for the stereo speaker system of FIG. 4b.

The serial input data SDI is received from the I²S bus 450 at the time of the assigned channel the bus driver 445 for transmission as the serial data SDI. The serial input data is applied to the channel receiver 455. The channel receiver 455 amplifies and conditions the received signal to generate the serial input data 457. The serial input data is applied to the channel selector circuit 460.

The serial clock signal SCK and the word select signal WS are generated and transferred from the master clock generator 425 to the first or second clocking/word select inputs 480 or 485 of the receive channel clock generator 465. The device as shown is connected for receiving on the right channel. The word select signal WS is applied to the first clocking/word select input 480 of the receive channel clock generator 465 and the serial clock signal SCK is applied to the second clocking/word select input 485 of the receive channel clock generator 465. The receive channel clock generator 465 determines which of the first or second clocking/word select inputs 480 or 485 that the serial data clock SCK is applied. Based on the connection of the serial data clock SCK, the channel select signal 475 is placed at a valid state at the time of the correct channel (left or right). The serial data clock 470, the word select signal 472 and the channel select signal 475 are transferred to the channel demultiplexer circuit 460. The channel demultiplexer circuit 460 selects the correct time and captures the serial data based on the valid state of the channel select signal 475. The captured serial data 462 is transferred to the data deserializer 490 to be converted to a parallel data 495. The parallel data 400 processed by a digital signal processor (DSP), a microcontroller, or an encoder/decoder (CODEC) (not shown) and stored to digital audio storage media such as a compact disk, digital video disk, or a networked storage media.

Figure 8:
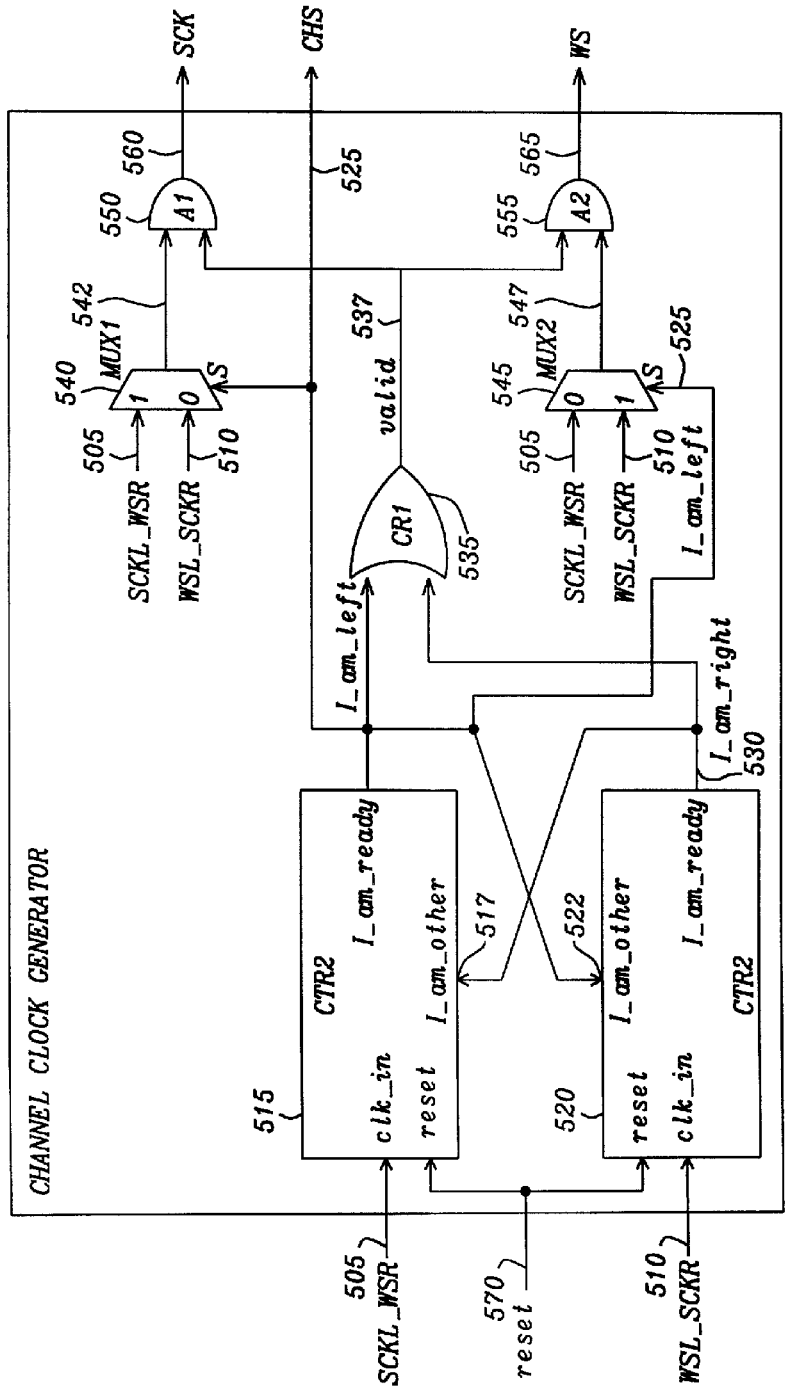
FIG. 8 is a schematic diagram of a channel clock generating circuit embodying the principles of this invention.

FIG. 8 is a schematic diagram of a channel clock generating circuit 500 as described in FIGS. 5, 6, 7a, and 7b. In the present embodiment, the channel clock generating circuit 500 has two counters 515 and 520. The first counter 515 is connected to the first clocking/word select input 505 and the second counter 520 is connected to the second clocking/word select input 510. The first and second counters 515 and 520 each have an output that indicates that one of the counters 515 or 520 is the fastest. In this embodiment, the first counter 515 is designated to indicate the left channel and the second counter 510 is designated to indicate the right channel. If the channel clock generating circuit 500 is associated with the left channel, the serial clock signal SCK is applied to the first clocking/word select input 505 and the word signal WS is applied to the second clocking/word select input 510. Conversely, if the channel clock generating circuit 500 is associated with the right channel, the word signal WS is applied to the first clocking/word select input 505 and the serial clock signal SCK is applied to the second clocking/word select input 510.

The first and second counters 515 and 520 increment at rising edge of the applied clocks—serial clock signal SCK and word signal WS. As soon as the serial clock signal SCK at the first or second clocking/word select inputs 505 or 510 reaches a certain value, the output signal 525 is set, taking the other counter ready signal 517 or 522 of the opposite counter 515 or 520 into account. Once this signal is set, the ready signal of the opposite counter 515 or 520 is inhibited from being set.

If the channel selector circuit 500 is configured to be associated with a left channel, the serial clock signal SCK is connected to the first clocking/word select input (right word select/left clock) 505 and the word select signal WS is connected to the second clocking/word select input (left word select/right clock) 510. The first counter 515 reaches a specified count and the output of the second counter 520 is not valid 520. The output 525 of the first counter 515 becomes valid (1) and the I_am_left signal 522 inhibits the output 530 of the second counter 520 from becoming valid. The outputs 525 and 530 of the first and second counters 515 and 520 are the inputs to the OR circuit 535 that becomes valid when one of the first or second counters 515 and 520 has determined the channel being used.

The first clocking/word select input 505 is connected to a first input (1) of a first multiplexer 540 and the second clocking/word select input 510 is connected to a second input (0) of the first multiplexer 540. The second clocking/word select input 510 is connected to a first input (1) of a second multiplexer 545 and the second first clocking/word select input 505 is connected to a second input (0) of the second multiplexer 540. The output 525 of the first counter 515 is connected to the select input (S) of the first and second multiplexers 540 and 545.

The output 542 of the first multiplexer 540 is connected to a first input of a first AND gate 550 and the output 547 of the second multiplexer 545 is connected to a first input of a second AND gate 555. The valid output 537 of the OR gate 535 is connected to the second inputs of the first and second AND gates 550 and 555. Once the valid output 537 indicates that one of the first or second counters 515 or 520 becomes active (1) and the output of the first counter 525 indicates which of the counters is active, the output of the AND gate 550 transfers the left clock (SCKL) or right clock (SCKR) to the clocking output SCK. Similarly, the output of the first counter 525 indicates which of the counters is active, the output of the AND gate 555 transfers the left word select (WSL) or right word select (WSR) to the word select output SCK. The channel select signal CHS that is the I_am_left signal 525 is transferred to the multiplexers 250 of FIGS. 5 and 440 of FIG. 7a or the demultiplexers 330 of FIGS. 6 and 460 of FIG. 7a. The channel select signal CHS is used by the multiplexers and demultiplexers to determine which phase of the time multiplexed data signal SD is to have data inserted into or removed from by the serial data interface transmitter or receiver circuits as shown in FIGS. 5, 6, 7a, and 7b.

Each of the counters receive an external reset signal 570 that is normally only activated during power-on. However, also possible that a detection circuit (not shown) monitors if the output signals (SD, WS, SCK) are valid (according to the specification of the interface), and activates a reset if something is wrong. Alternatively, the reset may be useful, if the channel is to be changed on-the-fly (from left to right for example), in that case there must be some recovery mechanism to adapt to that change.

If the channel selector circuit 500 is located in a left channel device, the output 525 of the first counter 515 is valid and the first input (1) of the first and second multiplexers 540 and 545 is selected. The serial clock SCK is transferred from the first input (1) to the output 542 of the first multiplexer 540. The word select signal WS is transferred from the first input (1) to the output 547 of the second multiplexer 545. If the channel selector circuit 500 is located in a right channel device, the output 530 of the second counter 520 is valid and the second input (0) of the first and second multiplexers 540 and 545 is selected. The serial clock SCK is transferred from the second input (0) to the output 542 of the first multiplexer 540. The word select signal WS is transferred from the second input (0) to the output 547 of the second multiplexer 545.

Figure 9B:
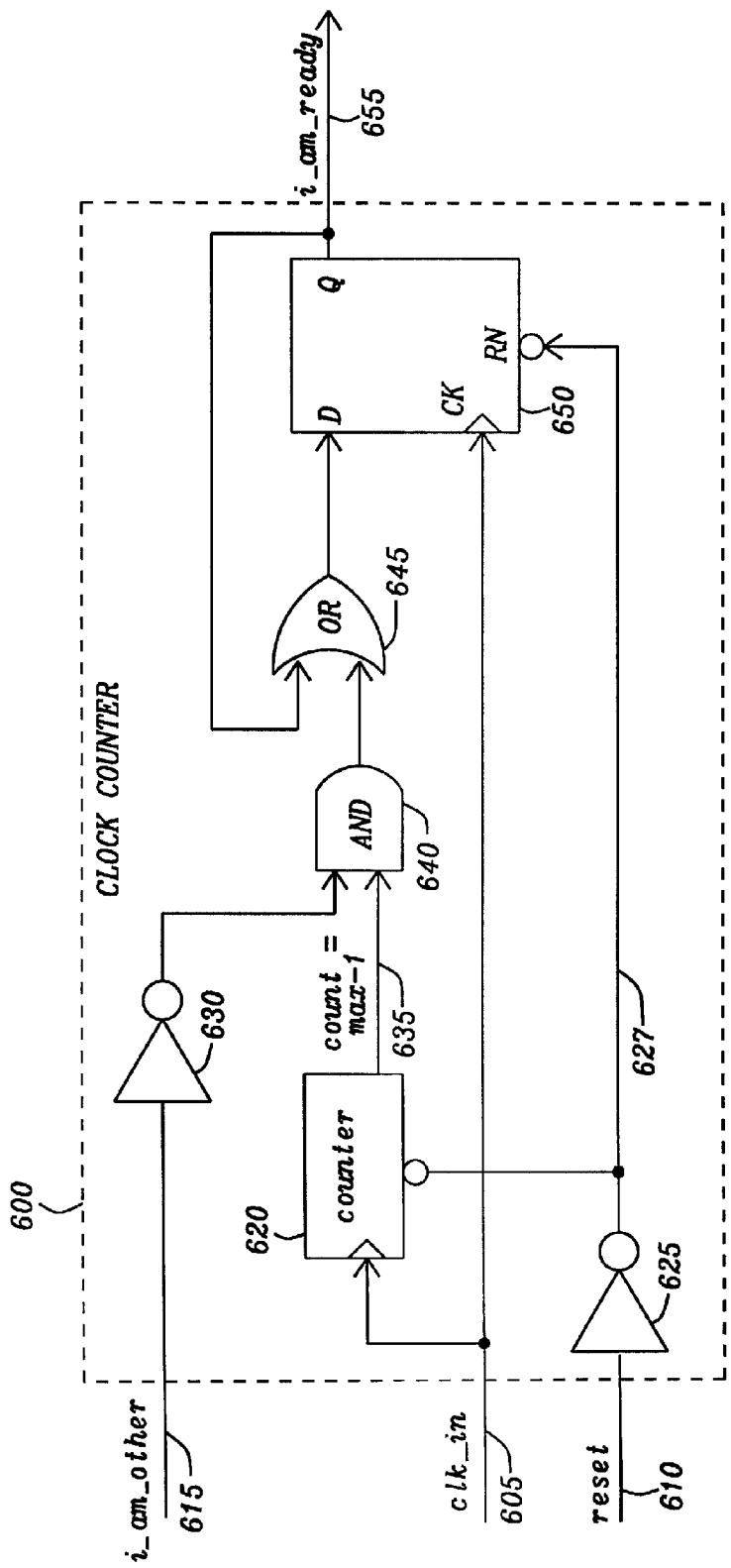
FIG. 9b is a schematic of the counters of FIG. 5 as implemented from the Verilog hardware description language listing of FIG. 9a embodying the principles of this invention.

FIG. 9a is a Verilog hardware description language (HDL) listing describing the structure of the first and second counters 515 and 520 of FIG. 5. FIG. 9b is a schematic of the counters of FIG. 5 as implemented from the Verilog hardware description language listing of FIG. 9a embodying the principles of this invention. The clock counter 600 as shown is an implementation of the first and second counters 515 and 520 of FIG. 8. The channel select inputs (WSR_CSKL and WSL_CSKR) are applied according to the channel identification to the clock input 600. The clock input 600 is the clock input to the counter 620 and the data latch 650. The reset signal 610 is applied to the input of the inverter circuit 625. The inverter circuit 625 is optional and is dependent on the polarity of the active state of the reset input 610. The output of the inverter circuit 625 is applied to the reset inputs of the counter 620 and the data latch 650. The other counter valid input signal (i_am_other) 615 is applied to the input of the inverter circuit 630. Again, the inverter circuit 625 is optional and dependent upon the active state of the other counter valid input signal 615.

Output 635 of the counter 620 becomes valid when the count of the input clock signal 605 becomes one less than the maximum count of the clock input signal 605. The maximum count performed by the counter 620 of the clock input signal 605 is set to be four clock counts. This count may be any suitable count and is sufficient for determining which input of the channel clock generating circuit 500 of FIG. 8 is the system clock SCK or the word select signal WS. At the third count, the output 635 of the counter 620 becomes valid. If the other counter valid input signal (i_am_other) 615 is not valid, the AND circuit 640 is active and the output 635 of the counter 620 is applied to the OR circuit 645 and thus to the data input D of the data latch 650 at the next clock transition the data output Q is activated and the clock signal identification is signal (i_am_ready) 655 is transferred as the output 525 of the first counter 515 or the output 530 of the second counter 520. The clock signal identification is signal (i_am_ready) 655 is applied to the input of the OR circuit 645 is hold the clock signal identification is signal (i_am_ready) 655 at the previous state unless changed by the output 635 of the counter 620 becoming valid.

Figure 10:
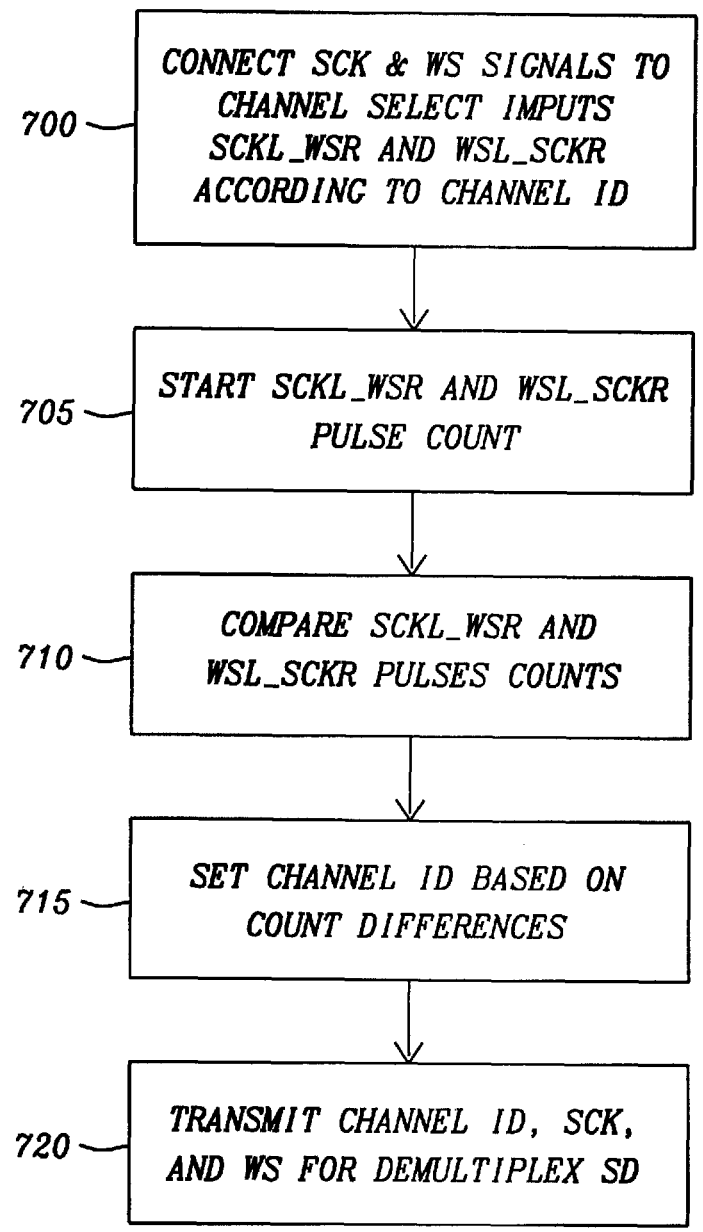
FIG. 10 is a flow chart defining a method for determining a channel within a multiplexed serialized data stream for a device to insert or extract serialized data from the multiplexed serialized data stream embodying the principles of this invention.

FIG. 10 is a flow chart defining a method for determining a channel within a multiplexed serialized data stream for a device to insert or extract serialized data from the multiplexed serialized data stream. A serial clock SCK and word select signals WS are applied (Box 700) to channel select inputs (WSR_CSKL and WSL_CSKR) according to the channel identification. The pulses of the serial clock SCK and word select signals WS as applied to the channel select inputs (WSR_CSKL and WSL_CSKR) are counted (Box 705). The counts of the channel select inputs (WSR_CSKL and WSL_CSKR) are compared (Box 710). When one of the counts reaches a specified amount, the channel select inputs (WSR_CSKL and WSL_CSKR) are designated (Box 715) to identify the channel of the serial data SD that the device is assigned. The channel identification, the serial clock, and the word select signal are transferred (Box 720) to determine the multiplexing/demultiplexing of the serial data.

The embodiment of this invention as described is particularly applicable to a system employing serial data interfaces such as the I²S standard for communicating between devices. However, the structure could be expanded. For example, an extra word select signal could be added to the bus structure and make it possible to determine the channels for six communication devices. There would be three counters with the serial clock signal SCK, a first word select signal WS1, and a second word select signal WS2 applied selectively to the inputs of the three counters. The counters would be connected as shown in Table 1

TABLE 1

| COUNTER 1 | COUNTER 2 | COUNTER 3 |
|---|---|---|
| SCK | WS1 | WS2 |
| SCK | WS2 | WS1 |
| WS1 | WS2 | SCK |
| WS1 | SCK | WS2 |
| WS2 | WS1 | SCK |
| WS2 | SCK | WS |

When the counter with the serial clock signal SCK has reach the predetermined count the remaining counters must then be queried to determine their state to determine the phasing of the word select lines WS1 and WS2 to determine which of the pair of channels identified by the serial clock SCK is the designated channel. Upon identification of the channel, the operation of the device is as described above. This structure permits a simplified time domain multiplexing without complex encoding and decoding of embedded messages with complex timing and channel identification structures.

While this invention has been particularly shown and described with reference to the preferred embodiments thereof, it will be understood by those skilled in the art that various changes in form and details as previously described may be made without departing from the spirit and scope of the invention.

The invention claimed is:

1. A channel clock generator circuit configured for identifying a channel for selection and insertion or extraction of digital data to or from a multiplexed serial data stream by a data processing device without the requirement of extra channel selection inputs, the channel clock generator comprising:
a plurality of counters structured such that each counter represents a channel of a multiplexed serialized data stream that is to be selected, wherein the input of each counter receives one of the multiple clocking/word select signals for synchronizing the multiplexed serialized data stream such that the input of the designated counter receives one clocking/word select signal that has a frequency indicative of the serial clock timing signal and the remaining counters receive the clocking/word select signal indicative of the word select signals for determining which channel is being selected;
a valid signal generator circuit connected to the plurality of counters for receiving a ready signal indicating that one of the counters has the one serial clock signal and is configured for generating a valid signal from the one serial clock signal for indicating that the correct serial clock signal and the correct word select signal are valid for gating to the data processing device; and
a plurality of multiple signal selection circuits connected to receive each of the multiple clocking/word select signals and in communication with the counter to receive the ready signal from at least one of the counters to select a correct clocking/word select signal from the multiple clocking/word select signals for providing a correct serial clock signal and correct word select signals to an external signal extraction or insertion circuit for extracting or inserting serial data to the multiplexed serialized data stream.

2. The channel clock generator circuit of claim 1 further comprising a plurality of gating circuits, each gating circuit in communication with an output of one of the plurality of multiple signal selection circuits and in communication with the valid signal generator to gate the correct serial clock signal and the correct word select signals to the external signal extraction or insertion circuit.

3. A channel clock generator circuit for selecting one of two channels of serial digitized data in the serial data stream comprising:
two counters structured such that each counter represents a channel of a multiplexed serialized data stream that is to be selected, wherein an input of each of the two counters is one clocking/word select signal, such that one of the two clocking/word select signals has a greater frequency than the other serial clocking/word select signal indicative of the serial synchronizing clock signal, wherein the serial clocking/word select signal having the frequency indicative of a serial clock timing signal is applied to the counter designating the channel of the serialized data, and wherein an input of the other counter receives the clocking/word select signal designating a word select signal for selecting the correct channel,
two multiplexers connected to the two counters such that a ready signal of one of the two counters is applied to a select input of each of the multiplexers and inputs of each of the two multiplexers are in communication with the serial clocking/word select signal, wherein the selection being such that a correct serial clock signal and a correct word select signal are selected to be applied to a data processing device; and
a valid signal generator circuit connected to the two counters to receive the ready signal from the two counters wherein one ready signal indicating that one of the counters has the serial clocking/word select signal of the frequency indicative of the serial synchronizing clock signal and from the ready signal, the valid signal generator circuit generates a valid signal for indicating that the correct serial clock signal and the correct word select signal are at a valid state for gating to the data processing device.

4. The channel clock generator circuit of claim 3 further comprising two gating circuits, each gating circuit in communication with an output of one of the multiplexers and in communication with the valid signal generator to gate the correct serial clock signal and the correct word select timing signal to the data processing device.

5. The channel clock generator circuit of claim 3 wherein the data processing device is a sound receiving device that receives sound, converts the sound to an electrical signal, and then converts the electrical signal to a digital signal that then is serialized for transmission.

6. The channel clock generator circuit of claim 3 wherein the data processing device is a sound reproduction device that receives a serialized data stream, converts the converts the data stream to an electrical signal, and then converts the electrical signal to sound.

7. The channel clock generator circuit of claim 3 wherein the ready outputs of the two counters are cross connected to a ready input of the opposite counter to prevent the ready signal of the opposite counter from becoming valid.

8. A serial communication system comprising:
- a system master device for generating a serial synchronizing clock signal and at least one word select signal and for receiving or transmitting a multiplexed serialized data stream;
- at least one transmitting or receiving device in communication with the system master device to receive the serial synchronizing clock signal and the at least one word select signal and is configured for determining a frequency difference from input terminals of the at least one transmitting or receiving device that identifies the serial synchronizing clock signal and the at least one word select signal off the transmitting or receiving device for an assigned channel within the multiplexed serialized data stream into which or from which the transmitting or receiving device is to transmit or receive the multiplexed serialized data stream.

9. The serial communication system of claim 8 wherein the at least one transmitting or receiving device comprises:
- a channel clock generator circuit comprising:
  - a plurality of counters structured such that each counter represents a channel of the multiplexed serialized data stream that is to be selected, wherein the input of each counter receives one of the multiple the serial synchronizing clocking/word select signals for synchronizing the multiplexed serialized data stream such that the input of the one counter receiving one the serial synchronizing clocking/word select signal has the frequency indicative of the serial synchronizing clock signal and the remaining at least one counter receiving the remaining multiple clocking/word select timing signals designating a word select signal that determines which channel is being selected,
  - a valid signal generator circuit connected to the plurality of counters to receive a ready signal indicating that one of the counters has received the serial synchronizing clocking/word select signal having the frequency indicative of the serial synchronizing clock signal and from the ready signal generating a valid signal for indicating that the correct serial synchronizing clock signal and the correct word select signal are valid for gating to the transmitting or receiving device, and
  - a plurality of multiple signal selection circuit connected to receive each of the multiple the serial synchronizing clocking/word select signal and in communication with the plurality of counters to receive the ready signal from at least one of the counters to select a correct clocking/word select signal from the input serial synchronizing clocking/word select signals for providing a correct serial clock signal and correct word select signals to an external signal extraction or insertion circuit for extracting or inserting serial data to the multiplexed serialized data stream; and
- a data processing device in communication with multiple channel clock generator circuits to receive a ready signal from at least one of the plurality of counters that acts as a channel indicator and the serial synchronizing clock signal and at least one word select signal for inserting or extracting data to or from the multiplexed serial data stream.

10. The serial communication system of claim 9 wherein the valid signal generator circuit comprises:
- a first logic circuit connected to receive the ready output signal from the plurality of counters creates the valid signal.

11. The serial communication system of claim 9 wherein each of the multiple signal selection circuits comprises:
- a multiplexer circuit having a select input connected to at least one of the counters to for receiving the channel indicator and connections to receive the multiple serial synchronizing clocking/word select signal for selecting the serial synchronizing clock signal and the correct word select signal associated with the selected channel;
- a second logic circuit connected to multiplexer circuit to receive the selected clocking/word select signal and to the valid signal generator to receive the valid signal for gating the selected clocking/word select signal to be transferred as serial synchronizing clock signal or the correct word select signal to the data processing device to insert or extract the data at the correct timings to select the correct channel.

12. The serial communication system of claim 9 wherein the ready output of each of the multiple counter is in communication with ready inputs of the other counter to prevent the ready outputs of the other counter from becoming valid when one of the counters activates its ready signal.

13. A method for determining a channel of a multiplexed serialized data stream by a transmitting or receiving device from a serial synchronizing clock signal and at least one word select signal, comprising the steps of:
- applying the serial synchronizing clock signal to a count input of a channel designating counter and an at least one word select signal to a count input of an at least one other counter;
- initiating the channel designating counter and the at least one other counter;
- identifying the channel of the transmitting or receiving device by activating a ready signal of the channel designating counter when the channel designating counter has reached a channel length count;
- preventing the at least one other counter from activating its ready signal; and
- transmitting the serial synchronizing clock signal, the at least one word select signal, and the ready signal to identify the channel having the serialized data designated to be inserted or extracted by the transmitting or receiving device.

14. The method of claim 13 wherein the transmitting or receiving device is a sound receiving device that receives sound, converts the sound to an electrical signal, and then converts the electrical signal to a digital signal that then serialized for transmission.

15. The method of claim 13 wherein the transmitting or receiving is a sound reproduction device that receives a serialized data stream, converts the converts the data stream to an electrical signal, and then converts the electrical signal to sound.

16. The method of claim 13 wherein the ready outputs of the channel designating counter and the at least one other counter are logically combined to generate a valid signal for gating the serial synchronizing clock signal and the at least one word select signal for selecting the correct data from the multiplexed serialized data stream.

* * * * *